Aug. 2, 1966   K. C. SMITH   3,264,037
AERATION CONE ASSEMBLY
Filed Feb. 11, 1965

INVENTOR.
KENNETH C. SMITH
BY Maybee & Legris
ATTORNEYS

United States Patent Office 3,264,037
Patented August 2, 1966

3,264,037
AERATION CONE ASSEMBLY
Kenneth C. Smith, Woodstock, Ontario, Canada, assignor to Pneuveyor Systems Limited, Woodstock, Ontario, Canada
Filed Feb. 11, 1965, Ser. No. 431,960
Claims priority, application Canada, Dec. 26, 1964, 919,621
1 Claim. (Cl. 302—52)

This invention relates to aeration assemblies used in discharging dry bulk materials from pressure type tank trailers, from material transfer tanks or from stationary storage silos and bins, with particular application to mobile tanks used for transporting materials from one point to another.

One object of this invention is to provide an aeration assembly for tanks whch has aeration passages that are automatically sealed whenever the internal pressure in the tank to which the aeration assembly is attached exceeds the pressure in the aeration passages, thus preventing entry of the tank contents into the passages. This permits the tanks to be used for both liquid and dry bulk handling.

Another object of this invention is to provide an aeration assembly of simple construction.

The invention involves the provision of a funnel converging downwardly to an opening through which flowable material can be funnelled and a downwardly converging cone frustum within the funnel upstream of the opening and defining with the funnel an annular space distinct from the funnel interior. At least the lower edge of the cone frustum is of resilient material and rests resiliently against the funnel to form therewith an acute angle such that if pressure within the annular space is sufficiently greater than that within the funnel interior, aeration of the contents of the funnel can take place beneath the lower edge of the cone frustum, and such that if the pressure within the funnel interior is greater than that within the annular space the lower edge of the cone frustum is pressed against the funnel to seal off the annular space from the funnel interior.

Figure 1:
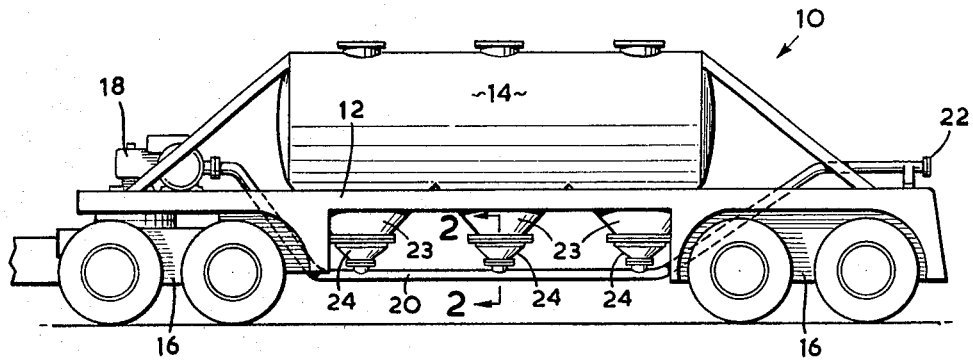
Figure 2:
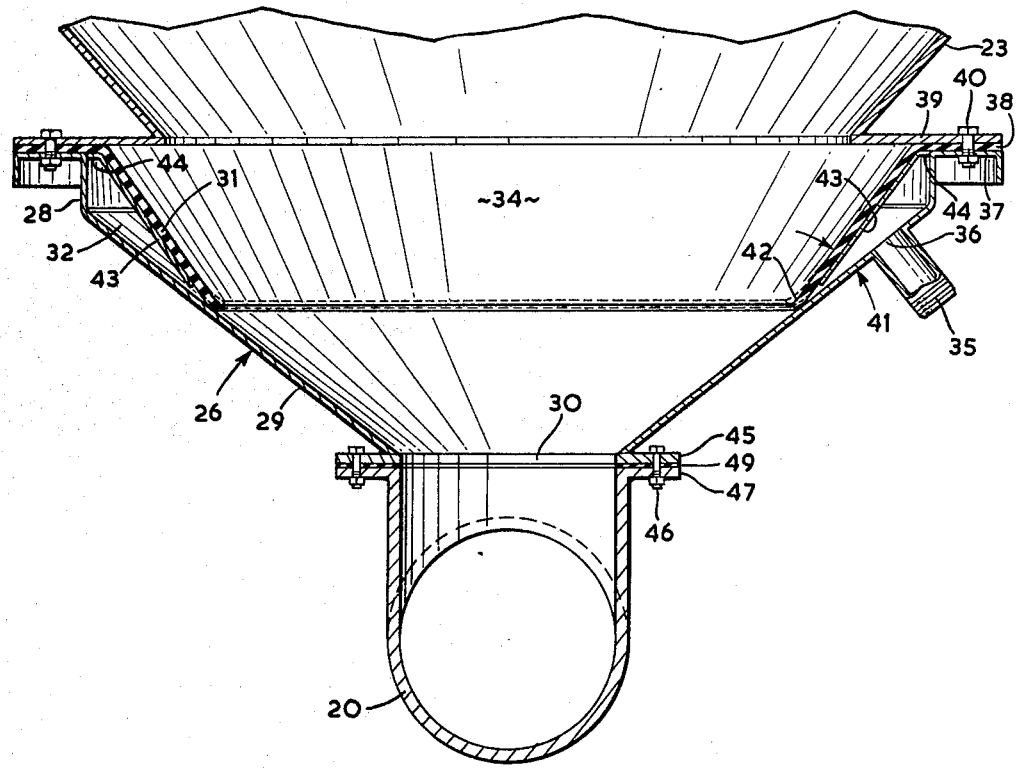

One embodiment of this invention is shown in the accompanying drawing, in which like numerals refer to like parts throughout the several views, and in which:

FIG. 1 shows a typical tank trailer to which aeration cone assemblies are attached; and FIG. 2 is an axial sectional view of an aeration cone assembly, taken at the line 2—2 in FIG. 1.

FIG. 1 shows a tank trailer 10 consisting generally of a tank frame 12 supporting a tank 14 and in turn supported at either end by wheel trucks 16. Installed at one end of the trailer frame 12 adjacent the end of the tank 14 is an air pump mechanism 18 whose function it is to deliver pressurized air at a high rate of flow through the pipe 20 to the delivery end 22. The bottom of the tank 14 is in the form of two or more (3 shown) converging bins 23 which communicate at their lower ends with the pipe 20. When delivery from the tank is desired, the tank 14 is first pressurized (as will be presently described), air is pumped through the pipe 20 by the mechanism 18, and the material contained within the tank 14, for example, cement, passes down gravitationally through the bins 23 and is entrained in the air flow through the pipe 20, to be ultimately delivered at the end 22.

When dry bulk materials stubborn to flow, such as cement, flour and other fine pulverants, are being handled, there is sometimes a tendency for the materal to bridge over the discharge opening. This problem is overcome by the provision of aeration means near the bottom of each bin 23. Aeration is carried out by forcing pressurized air into the dry bulk material where the bridging is taking place, the air preferably being directed downwardly along the sloping sides of the converging bins. The means by which the material is aerated is also the means for pressurizing the tank to prevent the conveying air in the pipe 20 from moving up into the tank 14. It is contemplated to employ the pump mechanism 18, in the usual manner, as the source of pressurized air for both purposes.

In FIG. 1, three aeration assemblies 24 are shown attached to the bottoms of the three bins 23.

FIG. 2 shows the construction of one of the aeration assemblies. An outer, conical funnel 26 consists of a cylindrical upper portion 28 and a conical lower portion 29, the conical lower portion 29 being integral with the upper portion 28 and converging downwardly therefrom to an opening 30 through which flowable material can be funnelled. A downwardly converging cone frustum 31 of resilient material such as rubber is fixed within the main funnel 26 upstream of the opening 30, and defines with the funnel 26 an annular space 32 partitioned from the funnel interior 34. The annular space 32 is substantially triangular in cross-section and is bounded by part of the conical lower portion 29, the whole of the cylindrical upper portion 28 and the cone frustum 31.

The conical lower portion 29 has an aperture 36 which constitutes an inlet passage opening into the annular space 32 for the entry of an aeration fluid such as air. A nipple attachment 35 for the inlet projects from the opening 36 and is adapted for connection to a pressurized air line (not shown).

The cylindrical portion 28 of the funnel 26 has an annular flange 37, and the cone frustum 31 has at its upper edge an integral outward radial extension 38. At the lower end of the bin 23 is an integral flange 39. The extension 38 is sandwiched between the two flanges 37 and 39, and the latter are secured together by radially spaced bolts 40. The cone frustum 31 forms with the conical lower portion 29 of the funnel an acute angle 41, with the lower edge 42 of the cone frustum 31 resting against the portion 29, such that if aeration fluid pressure within the annular space 32 is sufficiently greater than the pressure within the funnel interior, aeration fluid, in this case air, escapes beneath the lower edge 42 from the annular space 32 into the funnel interior 34 to aerate the contents thereof, and such that if the pressure within the funnel interior 34 is greater than that within the annular space 32 the lower edge 42 is pressed against the lower conical portion 29 of the funnel 26 to prevent the contents of the funnel interior 34 from passing beneath the lower edge 42 from the funnel interior 34 into the annular space 32.

In the event of high fluid or liquid pressure within the funnel interior 34, there is a danger that the resilient cone frustum 31 will distend, or collapse, outwardly against the funnel 26, and possibly be damaged in the process.

To prevent such outward distention of the resilient cone frustum 31, a rigid frusto-conical backing member 43 complementary with the cone frustum 31 is fixed within the annular space 32 in contact with the cone frustum 31. The backing member 43 is imperforate and preferably of a material which permits its being welded at its upper edge 44 to the cylindrical upper portion 28 of the funnel 26.

It has been found satisfactory to construct the funnel 26 and the backing member 43 of aluminum, while for the cone frustum 31 any of several sturdy rubber compounds can be employed.

The funnel 26 carries at the bottom a flange 45, which is adapted to be secured by bolts 46 to a similar flange 47 at the top of an inlet extension extending upwardly from the pipe 20. A sealing gasket 49 is located between the flanges 45 and 47.

Although in the present embodiment a backing member 43 has been provided, such provision is not considered essential to the invention, since provided that very high pressures were avoided in the interior 34 of the funnel 26, outward collapse or distention of the cone frustum 31 could be avoided.

What I claim as my invention is:

An aeration assembly comprising a funnel which includes a cylindrical upper portion and a conical lower portion, the conical lower portion converging downwardly from the cylindrical upper portion to an opening through which flowable material can be funnelled, a downwardly converging cone frustum of resilient material fixed within the funnel upstream of said opening and defining with said funnel an annular space partitioned from the funnel interior, the annular space being substantially triangular in cross-section and bounded by part of the conical lower portion, at least a part of the cylindrical upper portion and all of the cone frustum, an inlet passage opening into the annular space for the entry of fluid, the cone frustum being fixed securely at its upper edge to the cylindrical portion of the funnel and resting resiliently at its lower edge against the conical lower portion of the funnel, the cone frustum forming with the conical portion of the funnel an acute angle, such that if the aeration fluid pressure within the annular space is sufficiently greater than the pressure within the funnel interior aeration fluid escapes beneath said lower edge from the annular space into the funnel interior to aerate the contents thereof, and such that if the pressure within the funnel interior is greater than that within the annular space the lower edge is pressed against the funnel to prevent fluid from passing beneath the lower edge from the funnel interior into the annular space, and a rigid, imperforate, frusto-conical backing member complementary with the cone frustum being fixed within the annular space to support the cone frustum against distention outwardly towards the funnel in the event of high pressure within the funnel interior.

References Cited by the Examiner
UNITED STATES PATENTS

| | | | |
|---|---|---|---|
| 1,731,779 | 10/1929 | Houston | 302—29 |
| 2,255,438 | 9/1941 | Robinson | 302—53 |
| 3,099,494 | 7/1963 | Heinze | 302—31 |
| 3,125,256 | 3/1964 | Kokeisl | 302—29 X |
| 3,197,259 | 7/1965 | Braun-Angott | 302—53 |

EVON C. BLUNK, *Primary Examiner.*

A. L. LEVINE, *Assistant Examiner.*